July 20, 1965    D. SCHMIDT    3,195,674
BRAKE ACTUATING MECHANISM FOR MOTOR VEHICLE
Filed April 9, 1963
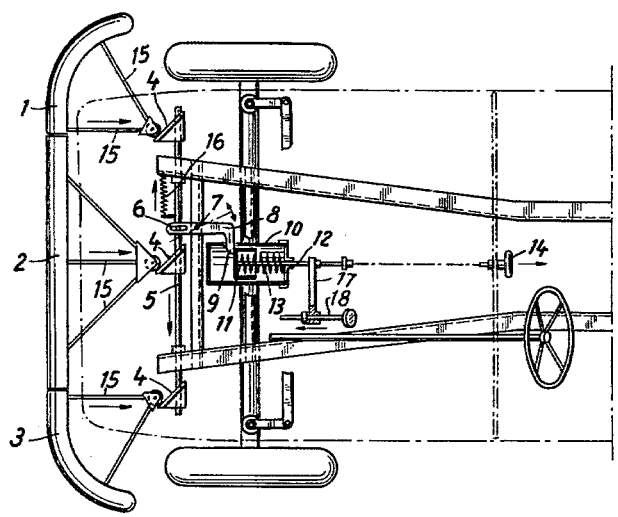

3,195,674
BRAKE ACTUATING MECHANISM FOR
MOTOR VEHICLE
Daniel Schmidt, Neuss-Weckhoven, Erprather
Muhlen, Germany
Filed Apr. 9, 1963, Ser. No. 271,618
Claims priority, application Germany, Mar. 19, 1963,
Sch 32,965
7 Claims. (Cl. 180—83)

The present invention relates to a device for actuating the brakes of a motor vehicle while in operation to reduce the extent of danger and damage during accidents, and particularly to a mechanism responsive to impact and adapted to actuate the brakes of the motor vehicle.

It is well known that the great majority of the damaging effects resulting during accidents with motor vehicles, for example during collisions or when the vehicle hits an obstacle or a person, is caused due to the fact that the motor vehicle does not come immediately to a halt, but that it takes a certain time until the driver is able to stop the vehicle. In these situations the slowness of driver's reflexes and sometimes the shock effect of the accident, for example when a child runs against a vehicle, cause a very slow and improper actuation of the vehicle brakes.

Accordingly, it is an object of this invention to provide means for braking a motor vehicle irrespective of the action or inaction of the driver, immediately in response to an impact at the front, or if desired, at the back of the vehicle.

According to the invention an impact absorbing or receiving mechanism is arranged at the front and if desired at the rear of the motor vehicle and connected to a servo-mechanism which actuates the vehicle brakes in response to an impact at the front or rear of the vehicle. Due to the actuation of the servo-mechanism which may operate like a servo-mechanism for steering the vehicle by oil pressure, the brakes become effective immediately, so that in most instances the damaging effects of an accident are substantially reduced, or prevented entirely.

At the front end of the vehicle an impact responsive grill or frame for receiving the shocks may be provided, whose rearward movement causes the actuation of the servo-mechanism. While in the case of passenger cars the impact grid would preferably be directed upwardly, it would be directed downwardly in the case of trucks, because in the latter construction there is relatively great distance from the ground and no protection from the wheels.

It may be appropriate to combine the novel brake actuating mechanism of this invention with the bumper which is usually provided on motor vehicles, so that an impact on the bumper actuates the brakes of the vehicle. In this instance it is preferable to construct the bumper of several parts, for example of three parts comprising a center portion and two corner portions, in order to provide a dependable actuation of the brakes through the bumper.

A possible embodiment would consist in providing a locking bolt to be actuated by the impact receiving member, whereby the locking bolt releases upon actuation a spring pressure which acts upon the brakes. The spring pressure may be set or tensioned by means of a handle provided at the panel board. Furthermore a locking member for locking the device may be provided on the driver's seat or on the panel-board in order to prevent an undesired operation of the braking mechanism, for example during parking and the like. The locking member may be combined for example with the actuating lever of the handbrake.

The drawing illustrates diagrammatically an embodiment of the invention. In the example chosen for the purpose of illustration, the front bumper is divided into three parts, each of which is arranged movably on the vehicle in such a way that upon any impact, even of small force, a displacement of the respective bumper part or parts takes place. This displacement or sliding of the bumper portion releases the locking device whereby a servo-force is released and activated.

Referring now to the single figure of the drawing, numeral 1 designates the bumper plate consisting of three parts, a curved right end portion 1, a central portion 2 and a curved left-end portion 3. These parts or portions are arranged slidably relative to the vehicle and transmit their motion through contact arms 15 over inclined surfaces 4 of a transversely slidable rod 5. Rod 5 is biased into its inoperative position by means of a spring 16 or the like. On this rod 5 a lever 8 which is pivotable at 7 is connected by an elongate opening 6. The lever has a nose 9 which reaches during the normal inoperative position of the lever into a cylinder 10 and engages behind a piston disc 11 received in the cylinder. The disc 11 is secured to a rod 12, which is connected to the brake mechanism of the motor vehicle by a bar 17 secured to the foot brake 18. A spring 13 presses against the disc 11. When the rod 12 is pulled back by means of a handle 14 provided on the panel board, the spring is tensioned whereby the nose 9 of the lever may engage behind the disc 11 and the spring is maintained in the tensioned condition. This is the normal position of the spring device.

Accordingly, it will be understood that when the bumper plate meets an obstacle, the portion which receives the impact is pushed back whereby the rod 5 is moved transversely. The rod thereby causes the lever 8 to tilt in such a manner that the nose 9 releases the spring 13 which in turn pushes the rod 12 which actuates the servo-mechanism which applies the brakes to stop the vehicle.

What is claimed is:

1. A brake actuating mechanism for motor vehicles comprising in combination impact receiving means mounted on the outside of the motor vehicle and adapted to recede upon impact, said impact receiving means having inwardly extending rigid contact arms, a slide rod having inclined contact surfaces adapted to be engaged by said contact arms and operative to move said slide rod transversely of said contact arms, a pressure cylinder, a poston rod mounted in said pressure cylinder and connected to the brakes of the motor vehicle at one end, a piston head on said piston rod at the other end, a spring means placed around said piston rod and adapted to be compressed between said piston head and one end of the piston cylinder, a pivotally mounted locking lever connected to said slide rod and having a nose portion pivotable into said cylinder to engage and lock said piston head in the inoperative position, and manually operable means for actuating said piston rod to compress said spring means, said locking lever being pivoted by said slide rod to disengage said piston head and release said spring means to actuate the vehicle brakes.

2. A brake actuating mechanism according to claim 1, wherein said impact receiving means are mounted across the front end of the motor vehicle.

3. A brake actuating mechanism according to claim 2, wherein a bumper is mounted at the front end of the motor vehicle, said impact receiving means being combined with said bumper.

4. A brake actuating mechanism according to claim 2, wherein said impact receiving means consists of a central portion and two side portions adapted individually to operate the brakes of the motor vehicle.

5. A brake actuating mechanism according to claim 1, wherein said manually operable means is mounted adjacent to driver's seat.

6. A brake actuating mechanism according to claim 1 wherein said piston rod is connected to the foot brake of the motor vehicle.

7. A brake mechanism according to claim 1 wherein said manually operable means is connected to said piston rod.

References Cited by the Examiner

UNITED STATES PATENTS

| 1,380,772 | 6/21 | Clark | 180—83 |
| 2,097,740 | 11/37 | Saigen | 180—83 |

FOREIGN PATENTS

| 271,179 | 5/27 | Great Britain. |
| 438,393 | 11/35 | Great Britain. |

A. HARRY LEVY, *Primary Examiner*.